United States Patent [19]

Kaneda et al.

[11] Patent Number: 5,357,160
[45] Date of Patent: Oct. 18, 1994

[54] IC CONTROLLED DC MOTOR

[75] Inventors: Isao Kaneda, Moriyama; Kohei Yonemura, Yokaichi, both of Japan; Sandro Cerato, Merate; Carlo C. De Martiis, Milan, both of Italy

[73] Assignees: Nippon Densan Corporation, Kyoto, Japan; SGS Thomson Microelectronics srl, Agrate Brianza, Italy

[21] Appl. No.: 6,307

[22] Filed: Jan. 22, 1993

[30] Foreign Application Priority Data

Jan. 24, 1992 [JP] Japan .................. 4-011425

[51] Int. Cl.[5] .................. H02K 7/14; H02K 11/00; H02K 7/08
[52] U.S. Cl. .................. 310/67 R; 310/68 R; 310/90
[58] Field of Search .................. 310/67 R, 43, 68 R, 310/DIG. 6, 90, 71; 361/402; 360/98.07, 99.04, 99.08

[56] References Cited

U.S. PATENT DOCUMENTS

| | | | |
|---|---|---|---|
| 4,529,900 | 7/1985 | Uzuka | 310/67 R |
| 4,604,665 | 8/1986 | Miller et al. | 310/67 R |
| 4,639,830 | 1/1987 | Fukuoka | 361/402 |
| 4,639,863 | 1/1987 | Harrison et al. | 360/98.01 |
| 4,818,907 | 4/1989 | Shirotori | 310/67 R |
| 4,930,029 | 5/1990 | Morita | 360/98.01 |
| 4,992,688 | 2/1991 | Cap et al. | 310/71 |
| 5,025,335 | 6/1991 | Stefansky | 360/97.01 |
| 5,252,873 | 10/1993 | Hamamoto et al. | 310/90 |

FOREIGN PATENT DOCUMENTS

| | | |
|---|---|---|
| 0163142 | 12/1985 | European Pat. Off. . |
| 0464644A1 | 1/1992 | European Pat. Off. . |
| 0127552 | 7/1983 | Japan ............ 310/40 MM |
| 0228940 | 9/1988 | Japan ............ 310/71 |

OTHER PUBLICATIONS

Patent Abstracts of Japan vol. 15, No. 284, Jul. 18, 1991 p. 80 E 1091 No. 3-998 451 (Matsushita).
Patent Abstracts of Japan vol. 10, No. 309, Oct. 21, 1986 p. 100 E 447 No. 61-121 756 (Tou Denshi).

*Primary Examiner*—Steven L. Stephan
*Assistant Examiner*—C. E. LaBalle
*Attorney, Agent, or Firm*—Nixon & Vanderhye

[57] ABSTRACT

A DC motor having a housing, a hub member rotatably supported by the housing, a flexible printed circuit board fixedly mounted on the housing, and an IC chip mounted on the flexible printed circuit board and located facing a recess formed in the housing. The hub member has a shaft rotatably supported by a bearing within the recess. The flexible printed circuit board has a metal layer for mounting the IC chip, the metal layer being isolated from a wiring pattern formed on the printed circuit board. The wiring pattern on the flexible printed circuit board is directly connected to a connection pin connected to the motor wiring.

10 Claims, 3 Drawing Sheets

IC CONTROLLED DC MOTOR

BACKGROUND OF THE INVENTION a) Field of the Invention

The present invention relates to a direct current (DC) motor, and more particularly to a DC motor which is controlled by an integrated circuit (IC).

b) Description of the Related Art

A spindle motor, one of various types of DC motors, has a housing including a stator, and a rotor rotatably supported on the housing and facing the stator.

In a brushless DC motor, permanent magnets are mounted on the rotor, and armature coils are mounted on the stator. Controlled DC current is supplied to the armature coils of the stator to rotate the rotor. In order to control the current flowing through the armature coils while monitoring the rotation of the rotor, a control IC is generally used. The control IC is mounted on and connected to an IC circuit board. The IC circuit board and the motor are interconnected by wirings such as flexible printed circuit board. This IC circuit board is also connected to an external power source and control circuit.

In a known structure of a DC motor, the housing is formed with a through hole at the central area thereof. Grooves are formed in the side wall of the through hole to mount armature coils within the grooves. The rotor has a shaft formed at the central area thereof. The rotor shaft is supported within the through hole of the housing by means of bearings. Permanent magnets are mounted on the rotor at its outer circular wall which is rotatably housed within a space formed in the groove.

SUMMARY OF THE INVENTION

It is an object of the present invention to provide a DC motor capable of reducing the whole size of the DC motor system including an control IC.

It is another object of the present invention to provide a DC motor having a simplified structure.

According to an aspect of the present invention, there is provided a DC motor including a housing, a rotor rotatably supported by the housing, a flexible printed circuit board including a wiring pattern and fixedly mounted on the housing, and an IC chip mounted on the flexible printed circuit board and located facing a recess formed in the housing, the IC chip being electrically connected to the wiring pattern.

The flexible printed circuit board is fixedly mounted on the housing of the motor, and the IC chip is mounted on the board, facing the recess of the housing. It is therefore possible to reduce the whole size of the motor system.

Use of the flexible printed circuit board having the metal layer for holding the IC chip allows heat generated by the IC chip to externally radiate via the metal layer, improving the heat radiation of the IC chip.

Connection of pins of the armature coils to the wiring patterns of the flexible printed circuit board further reduces the whole size of the motor system and allows easy electrical connection between the wiring patterns of the board and the armature coils.

Use of a connector mounted on the flexible circuit board for the electrical connection between the IC chip and an external power source makes easy the connection to the motor.

DETAILED DESCRIPTION OF THE PREFERRED EMBODIMENTS

An embodiment of a DC motor according to the present invention will be described with reference to the accompanying drawings.

Figure 1:
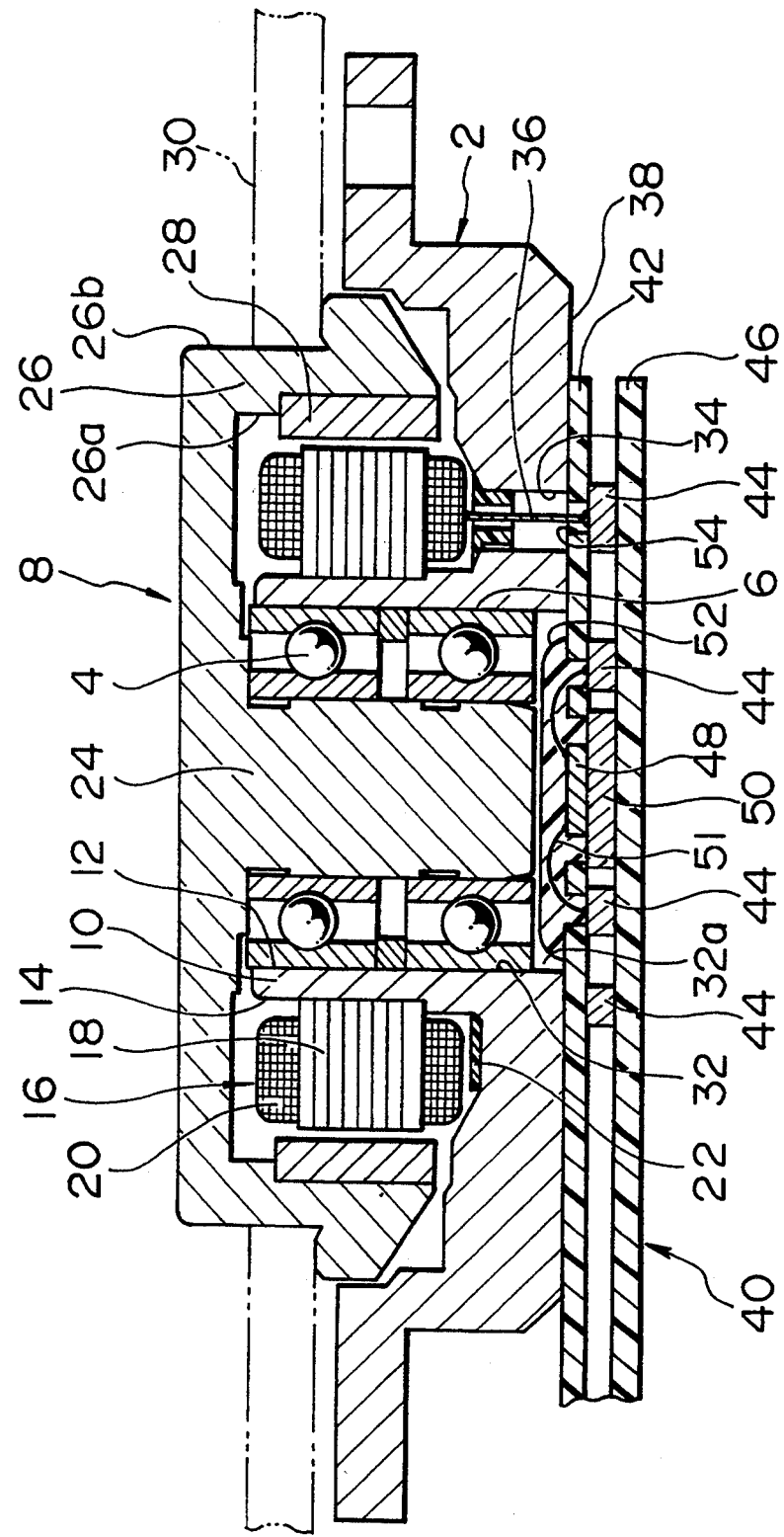
FIG. 1 is a cross sectional view showing an embodiment of a DC motor according to the present invention.
Figure 2:
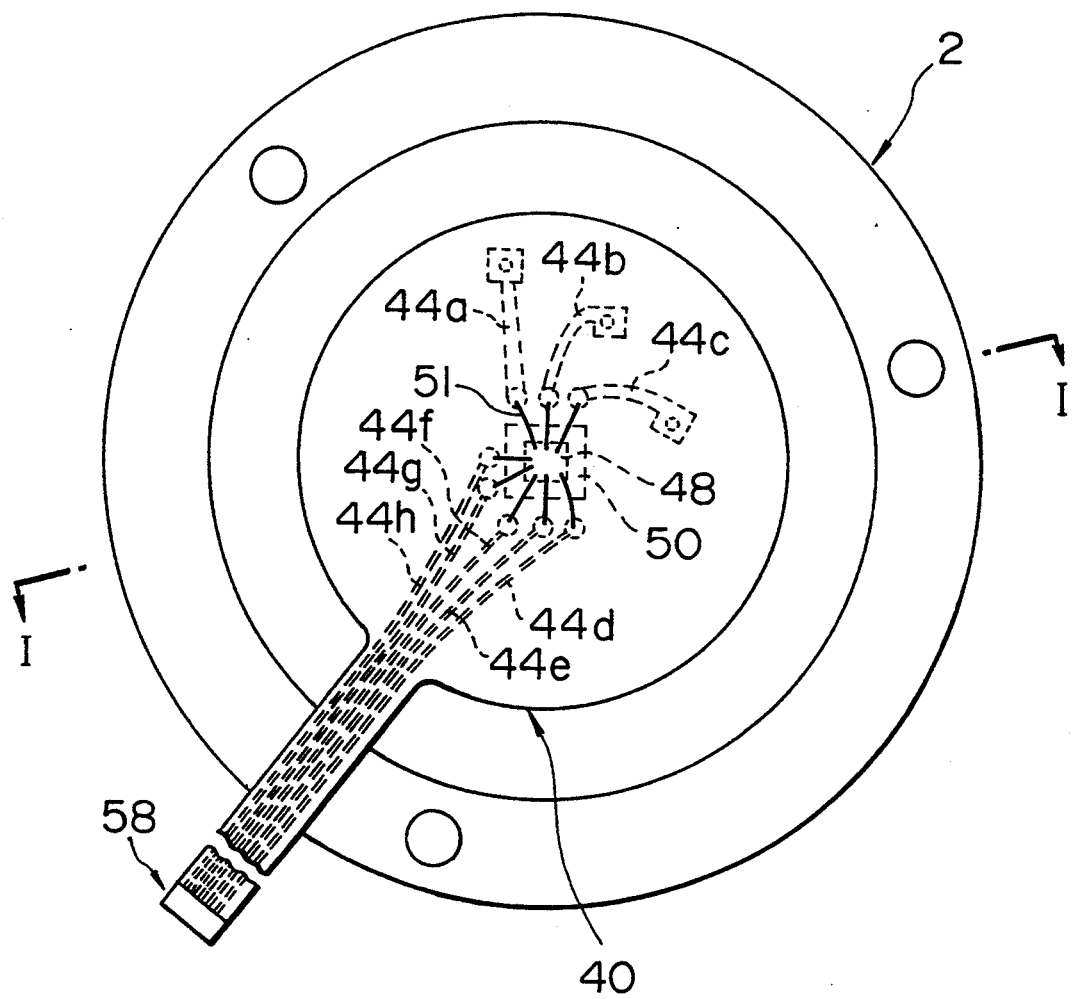
FIG. 2 is a bottom view of the DC motor shown in FIG. 1.

FIG. 1 is an elevational front view in section showing an embodiment of a brushless motor for hard disk drives according to the present invention, and FIG. 2 is a bottom view of the embodiment shown in FIG. 1 taken along line I—I.

Referring to FIGS. 1 and 2, a housing 2 made of aluminum rotatably supports a hub member 8 serving as a rotor by means of bearings 4 and 6.

A hollow cylinder 10 is formed in the housing 2 at the central area thereof. The inner wall 32 of the hollow cylinder 10 forms a through hole (recess) 32 passing through the housing 2, the through hole 32 having a diameter of about 8 mm. A stator 16 is fixedly mounted on the outer wall 14 of the hollow cylinder 10 of the housing 2. The stator 16 has stator cores 18 and armature coils 20 wound on the stator cores 18. Each stator core 16 is constructed of a plurality of silicon steel plates laminated one upon another.

The hub member 8 is made of magnetic stainless steel, and has a shaft 24 of a solid cylinder at its central area and a circumferential wall 26 at its outer periphery. The shaft 24 has a diameter of 4 mm in this embodiment. Mounted on the inner surface 26a of the circumferential wall 26 are rotor magnets 28 facing the stator 16. Each rotor magnet 28 is made of plastic magnetic material (called neody-bond) containing neodymium. A magnetic disk 30 is mounted on the outer surface 26b of the circumferential wall 26. The shaft 24 is rotatably supported within the thorough hole 32 of the housing 2 by means of the bearings 4 and 6, to thus rotatably support the hub member 8 relative to the housing 2. The rotor magnets 28, stator 16, and hub member 8 form a magnetic circuit.

The inner wall 32 of the hollow cylinder 10 of the housing 2 is set longer in the axial direction than the shaft 24. A space 32a is therefore provided which is defined by the inner wall 12 of the hollow cylinder 10 and the bottom surface of the shaft 24. The space 32a has a dimension of, for example, 8 mm in diameter and 0.7 mm in height.

The housing 2 is formed with a plurality of through holes 34 (three holes in the case of, for example, a three-phase delta connection). An insulating ring 22 made of resin is inserted between the housing 2 and armature coils 20. The insulating ring 22 is formed with through holes corresponding in position to the through holes 34. The ring 22 electrically insulates the armature coils 20 from the housing 2. On the stator 16 side, a connection pin 36 made of copper alloy is provided for each winding lead of the armature coil 20, and electrically connected at its upper end to the winding lead. The connection pin 36 is covered with an insulating sleeve (not shown) at its upper end portion, and fixed between turns of the coil winding. The lower end of each connection pin 36 is electrically soldered to a wiring pattern on a flexible printed circuit board 40 in the manner to be detailed later.

The flexible printed circuit board 40 has a wiring pattern 44 and insulating protective layers 42 and 46 sandwiching the wiring pattern 44. The wiring pattern 44 is made of copper foil or the like and has a thickness of about 35 $\mu$m. The insulating layer 42, 46 is made of polyimide and has a thickness of about 35 $\mu$m. The upper insulating layer 42 of the flexible printed circuit board 40 is fixedly attached to the bottom surface 38 of the housing 2 by means of adhesive epoxy resin.

Openings are formed in the insulating layer 42 of the flexible printed circuit board 40 at positions facing the through hole 32 of the housing 2. A metal pattern 50 made of copper or the like exposing through one of the openings has a motor drive and control IC chip 48 mounted thereon by using silver paste. The IC chip 48 has a dimension of, for example, 4 mm square and 300 $\mu$m in thickness. The metal pattern 50 is formed in the same layer of wiring patterns 44 disposed at the peripheral area of the metal pattern 50. The wiring patterns 44 also exposes through openings formed in the insulating layer 42. The IC chip 48 and wiring patterns 44 are interconnected by gold wires 51. The metal pattern 50 and wiring patterns 44 have predetermined shapes, and are connected to an external ground line, power source line, connection pins 36, and the like.

The IC chip 48 and wirings 51 are molded with epoxy resin 52 which occupies some of the space 32a formed within the housing 2. The thickness of the epoxy resin region 52 over the insulating layer 42 is 0.5 mm for example. The IC chip 48 supplies and controls current to the armature coils 20, and operates for example at a rated voltage 5 V and a maximum current 1 A. Heat is generated because of the power consumption by the IC chip 48. However, this heat generated by the IC chip 48 is radiated externally via the metal layer or pattern 50, because the metal layer 50 made of copper or the like has a high heat transfer coefficient. Heat generated by the IC chip 48 is also radiated upward via the resin 52 into the space 32a and out of the motor via the shaft 24 of the hub member 8 or the hollow cylinder 10 of the housing 10. The metal pattern 50 may be an isolated pattern or a pattern connected to the ground line.

Since the upper surface of the IC chip 48 is covered with the hub 8 made of magnetic stainless steel which is electrically conductive and magnetic, the IC chip 48 is shielded from magnetic induction of the stator 16 and permanent magnets 28 of the rotor.

The IC chip 48 is also sealed by the metal pattern 50, epoxy resin region 52, and insulating layers 42 and 46, so that it is free from the influence of external atmospheric conditions.

The connection pins 36 connected to the armature coils 20 are directly connected to the wiring patterns 44 (44a, 44b, 44c, refer to FIG. 2) on the flexible printed circuit board 40 via the insulating ring 22 and through holes 34. In connecting the connection pins 36 to the wiring patterns 44, the bottom ends of the connection pins 36 are, for example, circularly covered with solder, and the flexible printed circuit board 40 is placed on the bottom surface 38 of the housing 2 so that the circular ends of the pins 36 enter holes 54 formed in the insulating film 42 of the board 40.

The flexible printed circuit board 40 has a connector 58 for the connection to an external power source and control circuit (not shown). When the connector 58 is connected to the power source and control circuit, power and control signals are supplied to the IC chip 48 via wiring patterns 44d to 44h and wires 51.

Figure 3:
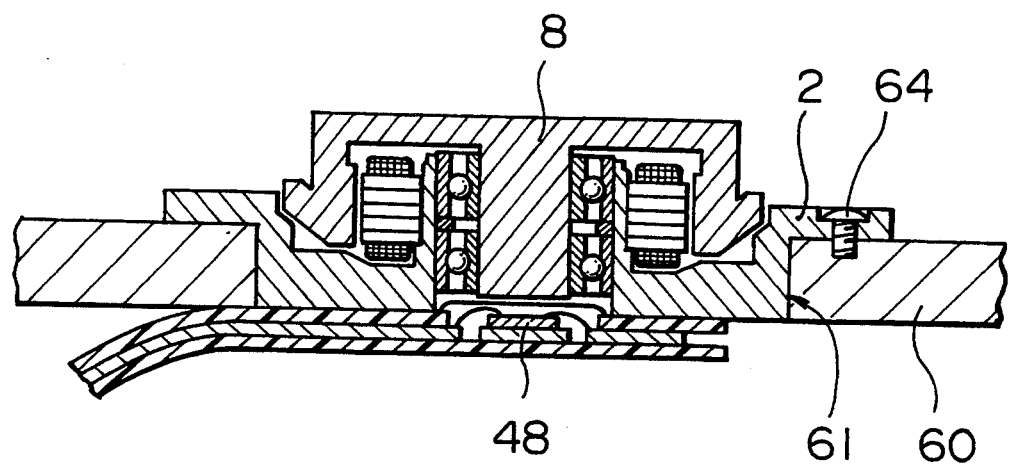
FIG. 3 is a schematic illustration in cross section showing the mount state of a DC motor on a chassis of a hard disk drive.

FIG. 3 shows the mount state of the motor on a chassis of a hard disk drive. The side wall of the housing 2 is tightly fitted in an opening 61 of the metal chassis 60, and a screw 64 fixedly mounts the housing 2 on the chassis 60. For general knowledges of such hard disk drive, reference is made to U.S. patent application Ser. No. 07/720,905, filed on Jun. 25, 1991, which is incorporated herein by reference.

Instead of providing the connector 58 to the flexible printed circuit board 40 for the connection to the external power source and the like, lead wires may be used for such connection.

Instead of welding the bottom surface of the IC chip to the metal pattern, the IC chip may be formed with bumps in place of pads and flip-chip-bonded to bumps formed on wiring patterns.

Furthermore, the IC chip may be mounted in a recess additionally formed in the housing, although use of the space into which the shaft 24 of the hub member 8 is inserted, can simplify the manufacturing process.

Although the preferred embodiment of the present invention has been described in connection with the accompanying drawings, the present invention is not limited only to the embodiment, but various modifications are possible without departing from the scope of the invention which is to be determined solely by the appended claims.

We claim:

1. A DC motor comprising:
   a housing having a hollow cylinder, a shaft disposed in said hollow cylinder, a rotor rotatable relative to the housing, a bearing provided between said cylinder and said shaft, a rotor magnet carried by said rotor, a stator mounted on an outer surface of said hollow cylinder, a flexible printed circuit board including a wiring pattern and fixedly mounted on said housing, and an IC chip mounted on said flexible printed circuit board, said hollow cylinder, said shaft and said flexible printed circuit board defining an accommodating space and said IC chip mounted on the flexible printed circuit being accommodated in said accommodating space.

2. A DC motor according to claim 1, wherein said flexible printed circuit board further includes a metal layer for mounting said IC chip, said metal layer being isolated from said wiring pattern on said printed circuit board.

3. A DC motor according to claim 2 wherein said metal layer is connected to a ground line.

4. A DC motor according to claim 1, further including a resin region for molding said IC chip.

5. A DC motor according to claim 4 wherein heat generated from said IC chip is radiated upwardly through said region and is radiated to the outside of the motor through the shaft or the hollow cylinder of the housing.

6. A DC motor according to claim 4 wherein an epoxy resin is used in said resin region.

7. A DC motor according to claim 1, further including a connection pin, one end of said pin being connected to a motor winding and the other end being connected to said wiring pattern on said flexible printed circuit board, and said wiring pattern being connected to said IC chip.

8. A DC motor according to claim 1, further comprising a connector connected to said flexible printed circuit board and adapted for connection to an external electric power source.

9. A DC motor according to claim 1 wherein said hollow cylinder has an inner wall and an axial extent greater than the axial extent of said shaft such that the inner wall of said cylinder extends axially beyond an end face of said shaft and defines with said shaft end face at least part of said accommodating space within said housing.

10. A DC motor according to claim 9 including a resin region for molding said IC chip and located in said part of said accommodating space.

* * * * *